(12) United States Patent
Daugherty

(10) Patent No.: US 10,274,244 B1
(45) Date of Patent: Apr. 30, 2019

(54) SYSTEMS AND METHODS FOR FREEZING LIQUIDS USING LIQUID NITROGEN

(71) Applicant: Stephen G. Daugherty, Atlanta, GA (US)

(72) Inventor: Stephen G. Daugherty, Atlanta, GA (US)

(*) Notice: Subject to any disclaimer, the term of this patent is extended or adjusted under 35 U.S.C. 154(b) by 0 days.

(21) Appl. No.: 16/157,169

(22) Filed: Oct. 11, 2018

(51) Int. Cl.
F25B 19/00 (2006.01)
F25D 19/00 (2006.01)
F25D 31/00 (2006.01)

(52) U.S. Cl.
CPC .......... *F25D 19/003* (2013.01); *F25B 19/005* (2013.01); *F25D 31/006* (2013.01)

(58) Field of Classification Search
CPC ........ F25D 19/003; F25D 31/006; F25D 3/10; F25D 3/105; F25D 3/107; F25C 1/04; F25C 1/22; F25C 2400/08; F25B 19/005; C12G 3/005; A23G 9/221
USPC ........................................ 62/51.1, 62, 457.9
See application file for complete search history.

(56) References Cited

U.S. PATENT DOCUMENTS

| | | | | | |
|---|---|---|---|---|---|
| 3,712,303 | A | * | 1/1973 | Merkt | A61D 19/022 600/35 |
| 8,857,205 | B2 | * | 10/2014 | Sherman | F25D 3/10 62/386 |
| 2008/0041070 | A1 | * | 2/2008 | Johnson | F25C 1/04 62/66 |
| 2016/0030286 | A1 | * | 2/2016 | Fazi | A61J 1/16 220/230 |
| 2016/0270423 | A1 | * | 9/2016 | Sherman | C12G 3/005 |

* cited by examiner

*Primary Examiner* — Joseph F Trpisovsky
(74) *Attorney, Agent, or Firm* — Clayton, McKay & Bailey, PC

(57) ABSTRACT

Described herein are systems and methods for freezing an alcoholic mixture using liquid nitrogen. The systems may comprise a ferromagnetic capsule configured to receiving an amount of alcoholic mixture, a cap comprising at least one magnet for magnetically sealing the capsule, a wand comprising at least one magnet for magnetically coupling to the capsule or the cap, and a vessel containing a quantity of liquid nitrogen maintained at or below its boiling point. In use, the alcoholic mixture can be poured into the capsule, the capsule can be sealed using the cap, and the wand can be used to submerge the capsule and the cap in the liquid nitrogen for a time sufficient to freeze the alcoholic mixture.

18 Claims, 4 Drawing Sheets

SYSTEMS AND METHODS FOR FREEZING LIQUIDS USING LIQUID NITROGEN

BACKGROUND OF THE DISCLOSURE

Many distilled spirits are gaining in worldwide popularity in recent years. For example, in 2017, annual sales of American whiskey grew $252 million to a total of $3.4 billion (an 8.1% increase). Similarly, gin and rum have achieved widespread popularity in the UK, each accounting for approximately £1 billion in sales in 2017.

With such widespread popularity, consumers have become more discerning in their drink preferences. Many consumers prefer their spirits and cocktails chilled. However, the use of ice in drinks causes dilution as the ice melts and waters down the drink contents. One proposed solution to this problem is "whiskey stones." Whiskey stones are typically small cubes of cut natural stone (e.g., soapstone) that can be chilled in a refrigerator or freezer and then added to a drink. The whiskey stones have the advantage of chilling a spirit or cocktail without causing gradual dilution, but they are not without their own drawbacks. Whiskey stones do not remain cold for very long as heat transfer takes place between the drink contents, the environment, and the stones. The stones also require hours of refrigeration between reuse and require cleaning. These constraints make them impractical in a high-volume, commercial setting like a bar or a restaurant. The stones are also very hard and could damage a person's teeth as the stones fall toward a drinker's mouth during a drink.

Accordingly, systems and methods could benefit from improved devices and techniques for chilling spirits and cocktails that do not result in the dilution of the drink's contents.

SUMMARY OF THE DISCLOSURE

In accordance with certain embodiments of the present disclosure, systems and methods for freezing alcoholic mixtures are disclosed. As used herein, the term "alcoholic mixture" means any mixture that contains alcohol, including but not limited to a substance containing 100% alcohol. Typical examples of an alcoholic mixture would be distilled spirits (bourbon, rye, vodka, etc.), mixed drinks comprising a distilled spirit and other ingredients, wine, beer, or any other alcohol-containing substance.

In one embodiment, a system comprising a capsule, a cap, a wand, and a vessel is disclosed. The capsule comprises a rim defining an opening for receiving an alcoholic mixture. The capsule, or a portion thereof, may also be comprised of a ferromagnetic material. The cap can comprise a magnet configured to magnetically couple to a ferromagnetic material portion of the capsule (e.g., the rim of the capsule). The wand may be an elongate handle comprising at least one magnet at its distal end. Like the magnet of the cap, the magnet of the wand may be configured to magnetically couple to a ferromagnetic material portion of the capsule (e.g., the bottom surface of the capsule) or the cap (e.g., the top surface of the cap). The vessel may contain a quantity of liquid nitrogen maintained at or below its boiling point. The vessel may comprise an opening configured to receive the capsule, the cap, and at least a portion of the wand.

A method described herein comprises pouring an alcoholic mixture into the capsule. The capsule can then be sealed so as to contain the alcoholic mixture by magnetically coupling the cap to the opening of the capsule. The wand can then be magnetically coupled to the capsule or the cap. A user can then grip the wand and lower the capsule, cap, and at least a portion of the wand into the vessel containing the quantity of liquid nitrogen. After the alcoholic mixture has been submerged in the liquid nitrogen for a period of time sufficient to freeze the alcoholic mixture, the capsule, cap, and portion of the wand can be removed from the liquid nitrogen-containing vessel. The wand and cap can then be de-coupled from the capsule and the frozen alcoholic mixture can be removed from the capsule. The frozen alcoholic mixture can then be used to chill an alcoholic drink such that as the frozen mixture melts, the alcoholic drink is not diluted.

Additional objects and advantages of the present disclosure will be set forth in part in the description which follows, and in part will be obvious from the description, or may be learned by practice of the disclosure. The objects and advantages of the disclosure will be realized and attained by means of the elements and combinations particularly pointed out in the appended claims.

It is to be understood that both the foregoing general description and the following detailed description are explanatory only and are not restrictive of the claims.

The accompanying drawings, which are incorporated in and constitute a part of this specification, illustrate several embodiments and together with the description, serve to explain the principles of the disclosure.

DESCRIPTION OF EXEMPLARY EMBODIMENTS

Figure 1:
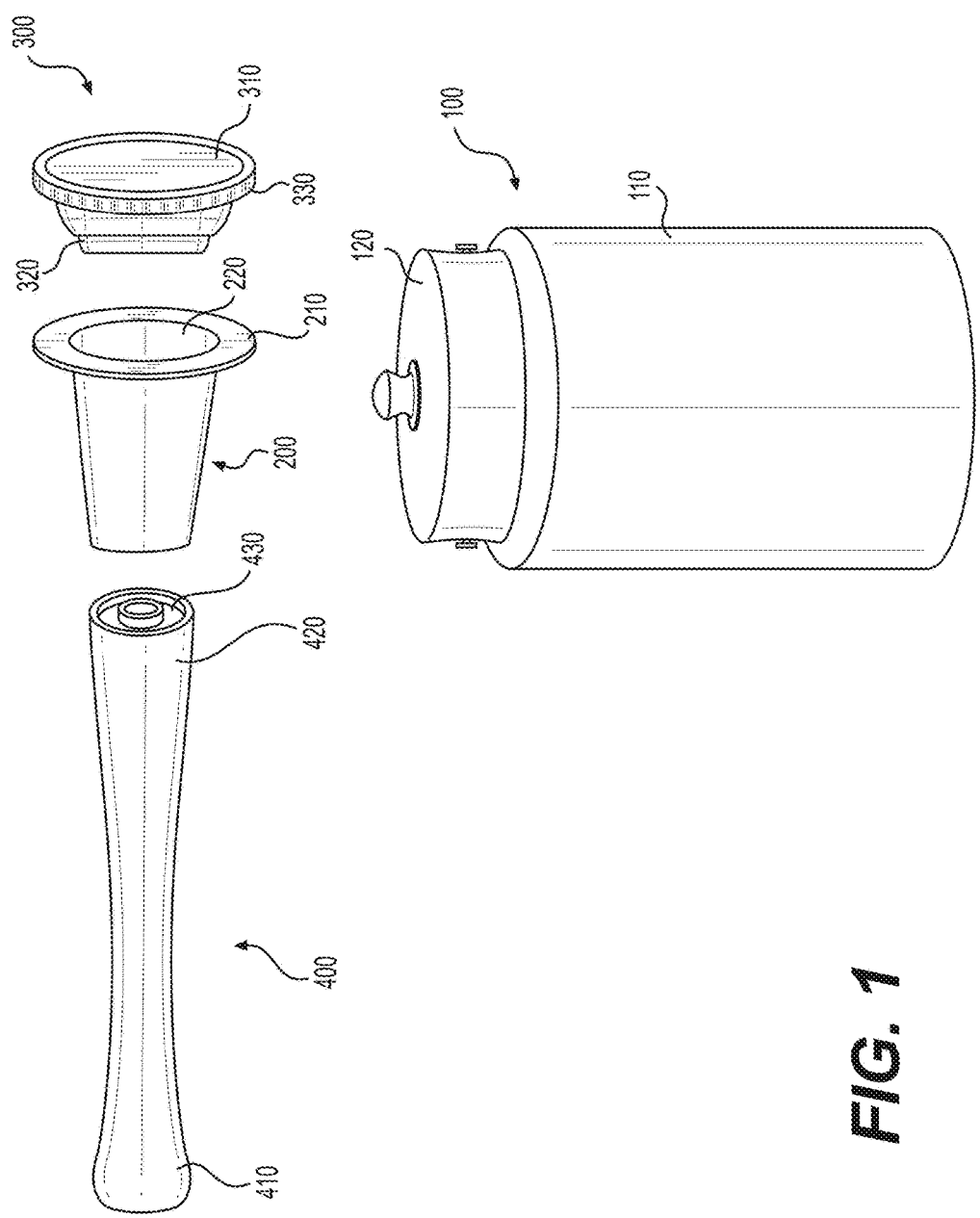
FIG. 1 depicts some aspects of an illustrative embodiment of a system as described herein.

Disclosed herein are various embodiments of systems and methods for freezing spirits and other liquids containing alcohol. The freezing point of alcohol is very low (i.e., −173.5° F. or −114.1° C.). Most drinks fit for consumption, however, are not pure alcohol. Many distilled spirits like bourbon, rye, tequila, vodka, and gin comprise between 30% and 70% alcohol (i.e., 60-140 proof). Mixed drinks that comprise distilled spirits and other non-alcoholic contents may have lower alcohol contents. Nonetheless, the freezing temperature of an alcohol-containing mixture can be quite low and standard refrigeration and freezing techniques are insufficient for freezing alcoholic mixtures. But liquid nitrogen, having an extremely low boiling point of −320° F. or 195.79° C., can be used to freeze small quantities (i.e., a few ounces or less) of even pure alcohol within a few minutes.

In some embodiments, a system may comprise: a dewar, a wand, a capsule, and a cap. The dewar can be a double-walled vessel, with a vacuum between the walls, used to store liquids at extremely low temperatures. The wand can be an elongate handle made of any suitable plastic or metal material and comprising a magnet at its distal end. The capsule can be a container comprised of a ferromagnetic metal (e.g., ferritic or martensitic stainless steel). In some embodiments, the capsule can be cup-like in shape with an annular rim for receiving a liquid. The cap, like the wand, can be comprised of any suitable metal or plastic. The cap may further comprise an annular magnet that corresponds in size to the annular rim of the capsule.

In use, a spirit or other high-alcohol content liquid can be poured into the capsule. The capsule can then be sealed shut by magnetically coupling the cap to the rim of the capsule. The distal end of the wand can then be magnetically coupled to the bottom of the capsule (opposite the end of the capsule to which cap is coupled). Using the wand, a user can lower the sealed capsule into the dewar containing an amount of liquid nitrogen. The contents of the capsule freeze after being submerged in the liquid nitrogen for a period of time. After freezing, the capsule can be removed from the dewar using the handle, the cap can be removed from the capsule, and the frozen contents can be removed from the capsule.

In one embodiment, the contents of the capsule comprise the same spirit or alcoholic mixture that a consumer wishes to consume in his or her drink. For example, if a consumer would like a chilled glass of "Brand A" bourbon, Brand A bourbon is poured into the capsule and frozen as described above. If the consumer would like a chilled Manhattan (a drink consisting of bourbon or rye, vermouth, and bitters), then any one ingredient or a mixture of them all can be placed in the capsule. The capsule contents are frozen by being submerged in liquid nitrogen and the frozen alcohol (e.g., Brand A bourbon or a Manhattan mix) can then be added to the consumer's drink. In this manner, the consumer's drink is chilled but the drink will not be diluted as the frozen alcohol melts. These systems and methods also avoid all the drawbacks of using whiskey stones.

Of course, these are only illustrative embodiments and other systems and methods may comprise fewer, additional, or alternative components and steps. For example, the steps set forth above can be performed in any suitable order or concurrently with one another (e.g., the wand can be magnetically coupled to the capsule before or after the cap is magnetically coupled to the capsule). Similarly, the components of the system can be combined in any suitable manner (e.g., the wand may be magnetically coupled to the cap rather than the capsule).

Reference will now be made in detail to certain illustrative embodiments, examples of which are depicted in the accompanying drawings. Wherever possible, the same reference numbers will be used throughout the drawings to refer to the same or like items.

FIG. 1 depicts one illustrative system for freezing alcoholic mixtures. In one aspect, the system can comprise a dewar 100, a capsule 200, a cap 300, and a wand 400.

The dewar 100 can be any container suitable for containing and/or transporting liquid nitrogen at or below its boiling point. In one embodiment, dewar 100 can comprise a double-walled, cylindrical vessel 110 and a lid 120. Lid 120 can be coupled to vessel 110 in any suitable manner (e.g., threadedly mated) that contains the liquid nitrogen and prevents evaporation when closed.

In another aspect, capsule 200 comprises a metallic vessel having an opening for receiving liquid contents and suitable for retaining the liquid contents. In one embodiment, capsule 200 can be substantially cup-shaped, i.e., substantially cylindrical or a truncated cone. Capsule 200 may comprise an annular rim 210 defining an opening 220 for receiving liquid contents. In alternative embodiments, rather than being metallic, capsule 200 may be constructed of a plastic material and have metallic elements embedded or otherwise attached proximate rim 210 and/or the bottom of capsule 200 (i.e., the end opposite rim 210).

Cap 300, in some embodiments, can exhibit a cross-section corresponding to the shape of rim 210 of capsule 200. In this manner, cap 300 can be placed over opening 220 to contain any liquid contents in capsule 200. Cap 300 can be comprised of any suitable plastic or metallic materials. In one aspect, cap 300 can comprise an annular magnet 330 that coincides in size and shape with at least a portion of rim 210 of capsule 200. Where capsule 200 and/or rim 210 is composed of a ferromagnetic material, cap 300 can be coupled to capsule 200 by placing magnet 330 in contact with rim 210. In other embodiments, alternative attachment means can be used to affix cap 300 to capsule 200, sealing the contents thereof (e.g., cap 300 can threadedly mate with capsule 200). However, embodiments employing magnetic forces for sealing capsule 200 have the advantage of being unsealed even after freezing of capsule 200 and cap 300 at very low temperatures. Other attachment mechanisms may require capsule 200 and cap 300 to defrost prior to unsealing capsule 200. In addition to magnet 330, cap 300 may also comprise a top portion 310 and a lower portion 320. Top portion 310 may comprise ridges around its circumference to provide a user with a better grip of cap 300. Lower portion 320, or a portion thereof, may extend into capsule 200 in use, providing an additional means for sealing capsule 200 closed.

The system depicted in FIG. 1 may further comprise a wand 400. Wand 400 can be an elongate handle having a proximate end 410 and a distal end 420. In one embodiment, wand 400 can be comprised of any suitable plastic or metal material. Distal end 420 may further comprise one or more magnetic elements. For example, distal end 420 may comprise an annular magnet 430.

Similar to magnet 330 of cap 300, magnet 430 of wand 400 can be used to couple distal end 420 of wand 400 to a portion (e.g., the bottom) of capsule 200. For example, where capsule 200 is comprised of a ferromagnetic material, bringing magnet 430 of wand 400 in contact with capsule 200 will couple wand 400 to capsule 200. As mentioned above with respect to cap 300, other suitable attachment mechanisms can be employed for coupling distal end 420 of wand 400 to capsule 200 (e.g., threadedly mating wand 400 and capsule 200), however, the magnetic coupling is advantageous because wand 400 and capsule 200 can be easily separated even when placed in extremely cold temperatures.

Figure 3:
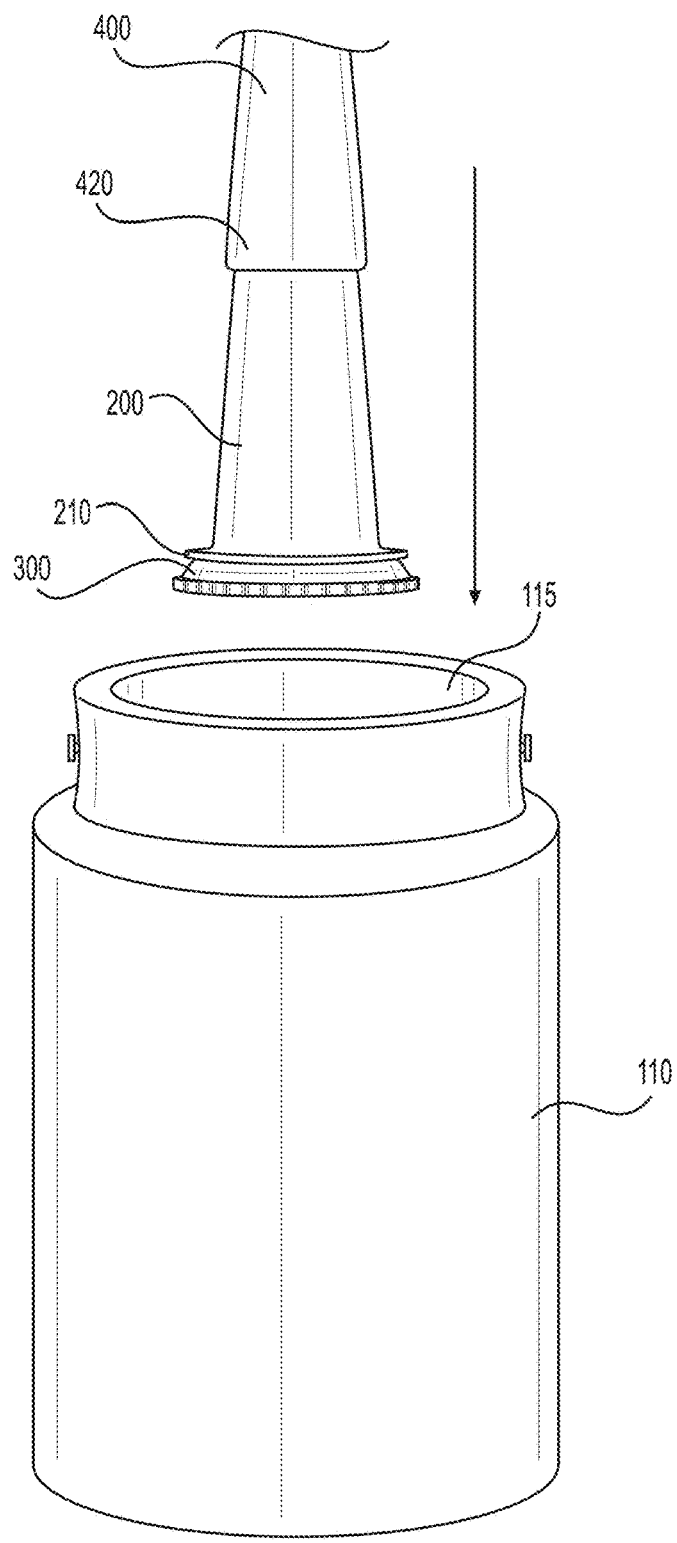
FIG. 3 depicts some aspects of an illustrative embodiment of a system as described herein.

Though FIGS. 1 and 3 depict coupling distal end 420 of wand 400 to the bottom of capsule 200, it should be appreciated that wand 400 could also be coupled to cap 300 after cap 300 has been coupled to capsule 200. In such embodiments, top portion 310 of cap 300 may be comprised of a ferromagnetic material that couples to magnet 430 of wand 400. Of course, in all the embodiments described herein, where one body is described as comprising a magnet for coupling to a metallic portion of another body, the reverse configuration is also possible, i.e., the first body may comprise the metallic portion and the other body may comprise the magnet(s).

Figure 2A:
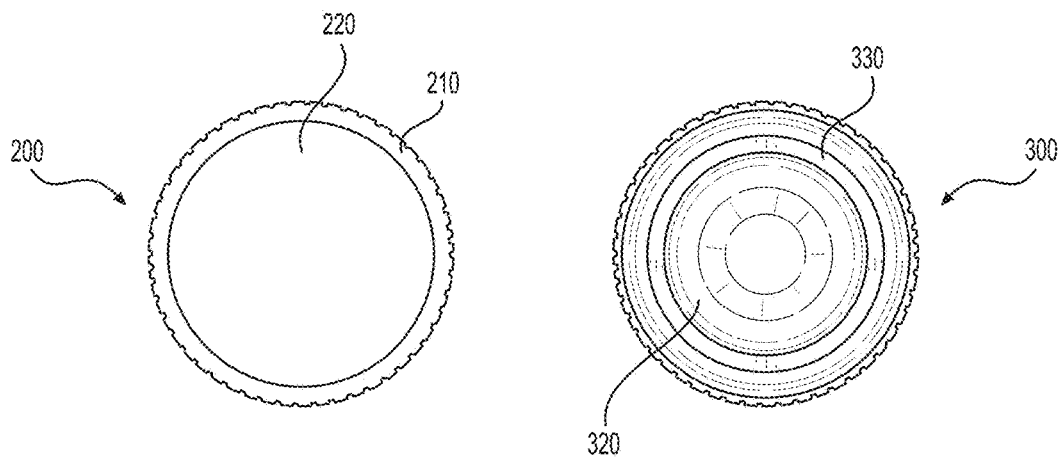
FIG. 2A depicts some aspects of an illustrative embodiment of a system as described herein.

FIG. 2A depicts a top view of capsule 200 and a bottom view of cap 300. As shown, rim 210 of capsule 200 is substantially circular and defines opening 220. Cap 300 comprises annular magnet 330 that substantially corresponds in size and shape to rim 210 of capsule 200.

Figure 2B:
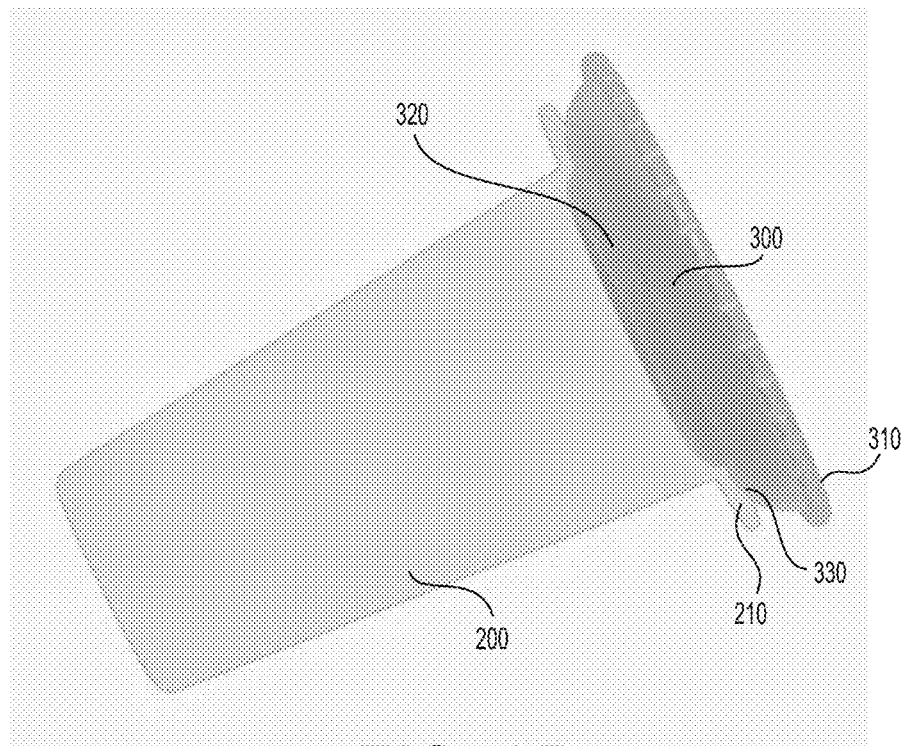
FIG. 2B depicts some aspects of an illustrative embodiment of a system as described herein.

FIG. 2B depicts cap 300 coupled to capsule 200. In one aspect, magnet 330 of cap 300 is in contact with metallic rim 210 of capsule 200. Lower portion 320 of cap 300 can extend, at least partially, into the opening of capsule 200 and aid in the containment of any contents in capsule 200. Top portion 310 of cap 300 can extend away from capsule 200 such that a user can grip cap 300 and separate cap 300 from capsule 200 after the contents of capsule 200 have been frozen.

FIG. 3 depicts the system in use. Vessel 110 can be filled with a quantity of liquid nitrogen at or below its boiling point of −320° F. Alcoholic contents can be placed in capsule 200 and capsule 200 can be magnetically sealed with cap 300. Wand 400 can then be magnetically coupled to the bottom of capsule 200 (as shown) or to top portion 310 of cap 300 (not shown). A user can then grip wand 400 and lower capsule 200 and cap 300 into vessel 110 through an opening 115. Capsule 200 and cap 300 can be submerged in the liquid nitrogen for a period of time sufficient to freeze the alcoholic contents of capsule 200 (e.g., 2-4 minutes).

Once the contents of capsule 200 are frozen, capsule 200 and cap 300 can be removed from vessel 110 using wand 400. Capsule 200, cap 300, and wand 400 can then be separated from one another and the frozen contents of capsule 200 can be removed from the capsule.

Figure 4:
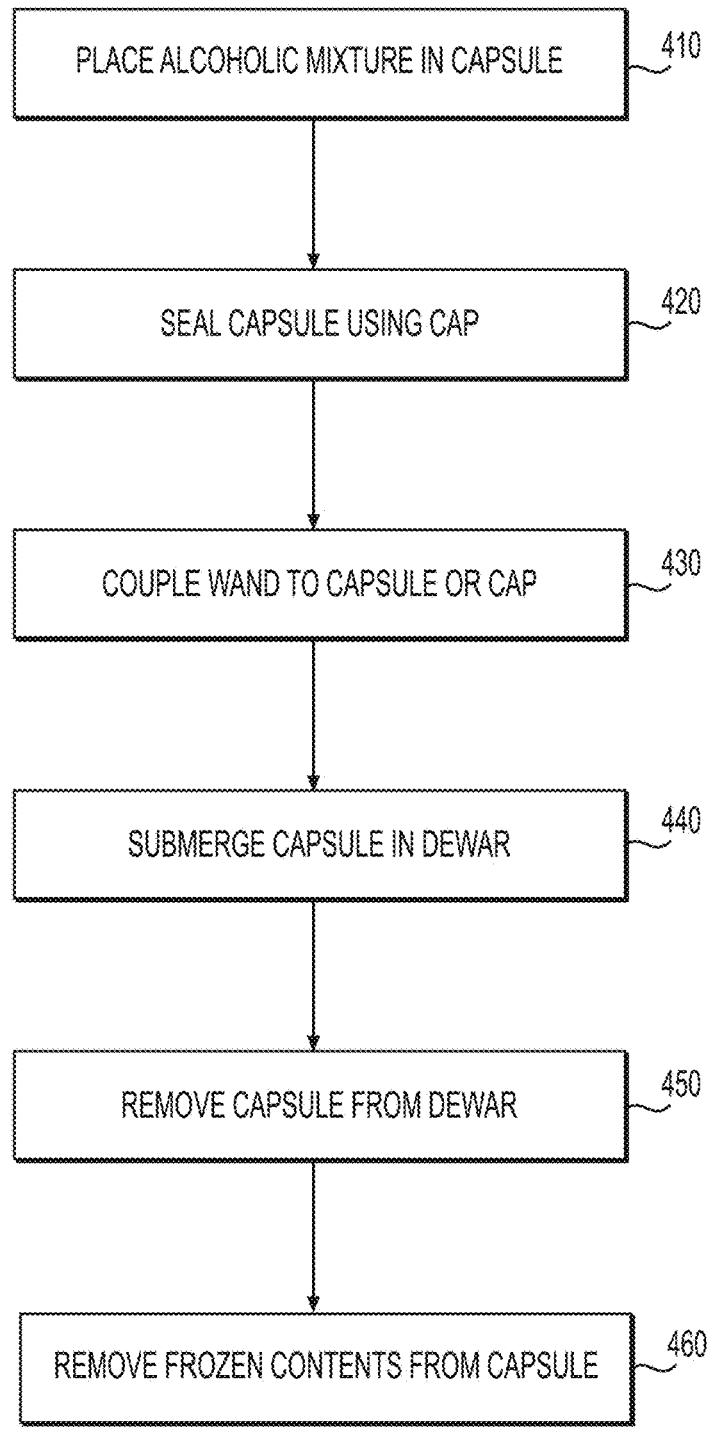
FIG. 4 depicts an illustrative embodiment of a method as described herein.

FIG. 4 depicts a method for freezing an alcoholic mixture using liquid nitrogen. At step 410, the alcoholic mixture can be placed in capsule 200. Capsule 200 can then be magnetically sealed using cap 300 at step 420. At step 430, wand 400 can be magnetically coupled to either capsule 200 or cap 300. Capsule 200 and cap 300, along with the alcoholic contents of capsule 200, can then be placed in a vessel and submerged in liquid nitrogen at step 440. After sufficient time has passed to freeze the alcoholic mixture contained in capsule 200 (e.g., 2-4 minutes), at step 450, capsule 200 and cap 300 can be removed from the vessel using wand 400. At step 460, the capsule 200, cap 300, and wand 400 can be separated, and the frozen contents of capsule 200 can be removed. The frozen alcoholic mixture can then be used to chill an alcoholic drink and the drink will not be diluted as the frozen mixture melts.

Other embodiments of the aforementioned systems and methods will be apparent to those skilled in the art from consideration of the specification and practice of this disclosure. For example, in some embodiments, wand 400 and capsule 200 can be integrated into a single component. The current embodiment has the advantage of being able to separate capsule 200 from wand 400 to clean capsule 200 while wand 400 can be re-used for making drinks with other capsules 200.

It is intended that the specification and the aforementioned examples and embodiments be considered as illustrative only, with the true scope and spirit of the disclosure being indicated by the following claims.

What is claimed is:

1. A system for freezing an alcoholic mixture, the system comprising: an alcoholic mixture,
    a capsule for receiving the alcoholic mixture, the capsule comprising a rim defining an opening;
    a cap comprising a first magnet, the cap configured to magnetically couple to the rim of the capsule;
    an elongate wand comprising a second magnet at a distal end, the wand configured to magnetically couple to the capsule; and
    a vessel containing liquid nitrogen, the vessel comprising an opening for receiving the capsule, the cap, and at least a portion of the wand,
    wherein the cap and the capsule are submerged in the liquid nitrogen for a period of time sufficient to freeze the alcoholic mixture.

2. The system of claim 1, wherein at least a portion of the capsule is comprised of a ferromagnetic material.

3. The system of claim 2, wherein at least a portion of the rim of the capsule is comprised of a ferromagnetic material.

4. The system of claim 1, wherein the vessel comprises a sufficient amount of liquid nitrogen such that the capsule and cap can be submerged in the liquid nitrogen.

5. The system of claim 4, wherein the elongate wand is long enough that when magnetically coupled to the capsule, the capsule can be submerged in liquid nitrogen inside the vessel and at least a portion of a proximate end of the elongate wand extends beyond the opening of the vessel.

6. The system of claim 1, wherein the cap is shaped such that after the cap is magnetically coupled to the rim of the capsule, the alcoholic mixture is sealed inside the capsule.

7. A system for freezing an alcoholic mixture, the system comprising: an alcoholic mixture,
    a capsule for receiving the alcoholic mixture comprising a rim defining an opening, the rim comprising a ferromagnetic metal;
    a cap comprising a first magnet, the cap configured to magnetically couple to the rim of the capsule in order to seal the alcoholic mixture in the capsule; and
    an elongate wand comprising a second magnet at a distal end, the wand configured to magnetically couple to the capsule or the cap,
    wherein the cap and the capsule are submerged in a vessel of liquid nitrogen for a period of time sufficient to freeze the alcoholic mixture.

8. The system of claim 7, wherein the second magnet of the elongate wand magnetically couples to a bottom portion of the capsule.

9. The system of claim 7, wherein the second magnet of the elongate wand magnetically couples to a top surface of the cap.

10. The system of claim 7, wherein the vessel comprises an opening for receiving the capsule, the cap, and at least a portion of the elongate wand.

11. The system of claim 7, wherein the liquid nitrogen is maintained at or below its boiling point.

12. The system of claim 7, wherein the entire capsule is comprised of a ferromagnetic material.

13. A method for freezing an alcoholic mixture, the method comprising:
    providing an alcoholic mixture in a capsule, the capsule having a rim comprising a ferromagnetic metal;
    magnetically coupling a cap comprising a magnet to the rim of the capsule in order to contain the alcoholic mixture in the capsule;
    submerging the cap and capsule in a reservoir of liquid nitrogen for a period of time sufficient to freeze the alcoholic mixture;
    removing the cap and capsule from the liquid nitrogen; and
    removing the frozen alcoholic mixture from the capsule by decoupling the cap and the capsule.

14. The method of claim 13, further comprising magnetically coupling a wand to the cap or capsule prior to submerging the cap and capsule in the reservoir of liquid nitrogen.

15. The method of claim 14, wherein magnetically coupling the wand to the capsule or the cap comprises magnetically coupling the wand to a bottom surface of the capsule opposite the capsule's rim.

16. The method of claim 14, wherein magnetically coupling the wand to the capsule or the cap comprises magnetically coupling the wand to a top surface of the cap.

17. The method of claim 13, wherein the liquid nitrogen in the reservoir is maintained at or below the boiling point of liquid nitrogen.

18. The method of claim 14, wherein the wand comprises an elongate body such that when the capsule, the cap, and at least a portion of the distal end of the wand are submerged in the liquid nitrogen, at least a portion of a proximate end of the wand extends beyond an opening of the reservoir.

* * * * *